(12) United States Patent
Carlson (10) Patent No.: US 11,009,595 B1
(45) Date of Patent: May 18, 2021

(54) CONTINUOUSLY VARIABLE OPTICAL BEAM SPLITTER

(71) Applicant: BAE SYSTEMS Information and Electronic Systems Integration Inc., Nashua, NH (US)

(72) Inventor: Robert T. Carlson, Bedford, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 17/097,374

(22) Filed: Nov. 13, 2020

(51) Int. Cl.
*G01S 7/499* (2006.01)
*G02B 27/28* (2006.01)
*G01S 17/08* (2006.01)

(52) U.S. Cl.
CPC .............. *G01S 7/499* (2013.01); *G01S 17/08* (2013.01); *G02B 27/283* (2013.01); *G02B 27/286* (2013.01)

(58) Field of Classification Search
CPC ..... G01S 7/499; G01S 7/4972; G02B 27/283; G02B 27/286
See application file for complete search history.

(56) References Cited

U.S. PATENT DOCUMENTS

| | | | |
|---|---|---|---|
| 3,284,632 A | 11/1966 | Niblack | |
| 4,199,226 A | 4/1980 | Weber | |
| 4,850,041 A * | 7/1989 | Roberts | G01S 7/4812 398/135 |
| 4,901,728 A | 2/1990 | Hutchison | |
| 5,060,304 A | 10/1991 | Solinsky | |
| 5,099,147 A | 3/1992 | Gregor | |

(Continued)

FOREIGN PATENT DOCUMENTS

EP 1054558 A1 11/2000

OTHER PUBLICATIONS

Bentz et al, Signal to Noise Ratio (SNR) Enhancement Comparison of Impulse Coding, Mar. 2014, Photonics, All Document, (Year: 2014).

(Continued)

*Primary Examiner* — Eric L Bolda
(74) *Attorney, Agent, or Firm* — Maine Cernota & Rardin; Scott J. Asmus (57) ABSTRACT

A continuously adjustable optical beam splitter includes a circular to linear polarization converter, a polarization rotator, and a polarization beam splitter that apportions light between two outputs. The polarization converter can include a quarter wave plate. The polarization rotator can include a mechanically rotated half wave plate or an electronically controlled liquid crystal variable retarder. The light source can be astronomical, reflected LIDAR light, or a laser beam from a remote laser communication node. Also disclosed is a free space laser communication terminal that implements the disclosed optical beam splitter, wherein the optical beam splitter diverts substantially all received laser light to an alignment channel during initial alignment, and then during message communication diverts more than 90%, and in embodiments up to 98%, of the received light to a communication channel, while alignment is maintained by continuing to divert the remaining laser light to the alignment channel.

17 Claims, 5 Drawing Sheets

(56) References Cited

U.S. PATENT DOCUMENTS

| | | |
|---|---|---|
| 5,212,594 A | 5/1993 | Joynes |
| 5,329,395 A | 7/1994 | Endo |
| 5,530,577 A | 6/1996 | Orino |
| 5,594,580 A | 1/1997 | Sakanaka |
| 5,627,669 A | 5/1997 | Orino |
| 5,659,413 A * | 8/1997 | Carlson ............... H04B 10/118 398/119 |
| 5,689,354 A | 11/1997 | Orino |
| 5,710,652 A | 1/1998 | Bloom |
| 6,091,528 A | 7/2000 | Kanda |
| 6,175,451 B1 | 1/2001 | Iriyama |
| 6,268,944 B1 | 7/2001 | Szapiel |
| 6,310,707 B1 | 10/2001 | Kawase |
| 6,327,063 B1 | 12/2001 | Rockwell |
| 6,330,092 B1 | 12/2001 | Aronson |
| 6,335,811 B1 | 1/2002 | Sakanaka |
| 6,384,944 B1 | 5/2002 | Takayama |
| 6,389,047 B1 | 5/2002 | Fischer |
| 6,414,773 B1 | 7/2002 | Masuzawa |
| 6,441,938 B1 | 8/2002 | Heflinger |
| 6,493,122 B1 | 12/2002 | Degura |
| 6,577,421 B1 | 6/2003 | Cheng |
| 6,616,352 B1 | 9/2003 | Shigeta |
| 6,717,654 B1 * | 4/2004 | Rajchel ................... G01S 17/86 356/4.01 |
| 6,968,133 B2 | 11/2005 | Sakanaka |
| 7,058,307 B2 | 6/2006 | Sakanaka |
| 7,076,171 B2 | 7/2006 | Ohtsubo |
| 7,277,641 B1 | 10/2007 | Gleckman |
| 7,289,737 B2 | 10/2007 | Ohmuro |
| 7,343,099 B2 | 3/2008 | Wirth |
| 7,346,282 B2 | 3/2008 | Sakanaka |
| 7,450,855 B2 | 11/2008 | Ohmuro |
| 8,417,126 B2 | 4/2013 | Mandai |
| 9,140,901 B2 | 9/2015 | Staver |
| 10,158,427 B2 | 12/2018 | Carlson |
| 10,331,008 B1 | 6/2019 | Tam |
| 2001/0003442 A1 | 6/2001 | Smith |
| 2001/0043379 A1 | 11/2001 | Bloom |
| 2002/0080452 A1 | 6/2002 | Sakanaka |
| 2002/0131121 A1 | 9/2002 | Jeganathan |
| 2002/0196506 A1 | 12/2002 | Graves |
| 2004/0042798 A1 | 3/2004 | Kehr |
| 2004/0081466 A1 | 4/2004 | Walther |
| 2004/0141753 A1 | 7/2004 | Andreu-von Euw |
| 2004/0202472 A1 | 10/2004 | Giles |
| 2004/0262499 A1 * | 12/2004 | Martinelli ............. G02F 1/0136 250/225 |
| 2005/0141897 A1 | 6/2005 | Takahashi |
| 2006/0088074 A1 | 4/2006 | Johnstone |
| 2007/0031150 A1 | 2/2007 | Fisher |
| 2007/0031151 A1 | 2/2007 | Cunningham |
| 2007/0253053 A1 * | 11/2007 | Suzuki ................. G02B 27/286 359/239 |
| 2008/0219579 A1 | 9/2008 | Aksyuk |
| 2009/0237662 A1 | 9/2009 | Chang |
| 2009/0257755 A1 | 10/2009 | Buelow |
| 2011/0181881 A1 | 7/2011 | Mathur |
| 2011/0274432 A1 | 11/2011 | Cunningham |
| 2012/0087500 A1 | 4/2012 | Ukita |
| 2012/0128374 A1 | 5/2012 | Yang |
| 2012/0308239 A1 | 12/2012 | Sheth |
| 2012/0315043 A1 | 12/2012 | Nakagawa |
| 2014/0233958 A1 | 8/2014 | Hulsey |
| 2014/0241729 A1 | 8/2014 | Brooks |
| 2015/0215040 A1 | 7/2015 | Dickson |
| 2016/0013882 A1 | 1/2016 | Hashimoto |
| 2017/0038258 A1 * | 2/2017 | Hegyi .................. G02B 27/286 |
| 2017/0054499 A1 | 2/2017 | Graves |
| 2017/0055051 A1 | 2/2017 | Mao |
| 2017/0310084 A1 | 10/2017 | Kim |
| 2017/0346564 A1 | 11/2017 | Wiswell |
| 2018/0088280 A1 | 3/2018 | Kim et al. |
| 2018/0106901 A1 * | 4/2018 | Frederiksen .......... G01S 7/4816 |
| 2018/0191446 A1 | 7/2018 | Blanks |
| 2019/0052045 A1 | 2/2019 | Metzger |
| 2019/0075281 A1 * | 3/2019 | Hall .......................... G02F 1/33 |

OTHER PUBLICATIONS

Notice of Allowance for U.S. Appl. No. 16/720,362, dated Sep. 2, 2020, 13 Pages.

"Basic Polarization Techniques and Devices," Meadowlark Optics, Inc., 2005. 7 Pages.

Notice of Allowance for U.S. Appl. No. 16/694,082, dated Feb. 12, 2020, 23 Pages.

Nakata et al., "Reconfigurable Terahertz Quarter-Wave Plate for Helicity Switching Based on Babinet Inversion of an Anisotropic Checkerboard Metasurface", Apr. 2019, American Physical Society (Year: 2019).

Office Action for U.S. Appl. No. 16/720,362, dated Mar. 18, 2020, 43 Pages.

* cited by examiner

CONTINUOUSLY VARIABLE OPTICAL BEAM SPLITTER

RELATED APPLICATIONS

This application is related to U.S. patent application Ser. No. 16/694,082, filed on Nov. 25, 2019, now U.S. Pat. No. 10,637,572 and U.S. patent application Ser. No. 16/720,362, filed on Dec. 19, 2019, now U.S. Pat. No. 10,841,007, both of which are by the present inventor and are assigned to the present Applicant. Both of these applications are incorporated herein by reference in their entirety for all purposes.

FIELD OF THE DISCLOSURE

The present disclosure relates to light detection apparatus, and more particularly, to optical beam splitters implemented in apparatus that is configured to receive and process light received over free space from a remote source.

BACKGROUND

Apparatus that is configured to receive and process light over free space from a remote source is often required to transition between phases of operation, which may include an "alignment" phase during which the light from the remote light source is detected and the system optics are aligned with the remote light source, and a processing phase during which the light that is received from the remote light source is processed. Often, it is necessary to continue to "track" the remote light source, i.e. maintain the alignment with the remote light source, during the processing phase. Non-limiting applications of such apparatus include free space laser communications (terrestrial, airborne, and space); laser ranging and LIDAR; and certain astronomical observations.

For example, a free space laser communication receiver is required to detect laser light transmitted by a remote communication node, align itself with the remote node, and then receive and process laser communications transmitted by the remote node while maintaining the alignment. A LIDAR apparatus must locate a remote target, point a laser beam at the target, and then maintain the application of the beam onto the target while reflected laser light is analyzed to determine the direction and distance to the target. Similarly, astronomical observation of a distant light source, such as a planet or star, requires detection of the distant light source and alignment of the telescope or other observation optics with the light source, followed by receiving and processing light received from the distant light source, typically over an extended period of time during which precise alignment with the distant light source must be maintained.

The various types of apparatus that are used to perform these tasks typically include distinct sub-systems or "channels" that are dedicated to the functions that must be performed during the different phases of operation. For example, a laser communication terminal will typically include separate alignment and communication channels.

The implementation of multiple channels within a light receiving apparatus requires that the received light must be distributed between the channels. Often, it is necessary during at least one operational phase to simultaneously apportion the received light among more than one of the channels For example, co-pending U.S. patent application Ser. No. 16/720,362, which is by the present inventor, is assigned to the present Applicant, and is incorporated herein by reference in its entirety for all purposes, discloses a free space laser communication terminal which implements a "receive beam splitter" that divides received light between an alignment channel and a communication channel. Rather than implementing a separate "beacon laser," the laser terminal that is disclosed by application Ser. No. 16/720,362 uses the receive beam splitter to divert a small portion of the received, message-carrying laser light to the alignment channel during the communication phase, which is used by the alignment channel to maintain optical alignment with a remote node during receipt of laser communications.

Received light can be apportioned between more than one channel of an apparatus by a fixed beam splitter, such as a partially silvered mirror or a dichroic beamsplitter. However, this approach often results in a compromise that is not ideal for any of the operational phases. For example, ideally the laser communication terminal of application Ser. No. 16/720,362 would divert all of the received light to the ATS during the alignment phase, and then would divert only a very small percentage of the received light to the alignment channel during the communication phase, once the nodes have been aligned and the divergence of the received beam has been reduced. If a fixed beam splitter is implemented in such a case, for example a splitter that directs 20% of the received light to the alignment channel and 80% of the received light to the communication channel, the result will be a compromise that is far from ideal for both the alignment phase and the communication phase.

Another approach is to provide two or more beam splitters having different splitting ratios, and to switch between them as the apparatus transitions between operational phases. However, this approach is wasteful of space and energy, and at best supports only a few selectable splitting ratios.

What is needed, therefore, is an optical beam splitter and method of use thereof that enables light to be received from a remote source and to be flexibly apportioned between more than one channel of an apparatus without consuming undue space and energy.

SUMMARY

The present disclosure is an optical beam splitter and method of use thereof that enables light to be flexibly apportioned between more than one channel of an apparatus without consuming undue space and energy. More specifically, the present disclosure is an optical beam splitter and method of use thereof that enables light to be received from a remote source and apportioned between two channels of an apparatus according to a continuously adjustable splitting ratio.

According to the present disclosure, the light enters the apparatus in a state of circular polarization. Depending on the implementation, this can be ensured, for example, by a LIDAR transmitting circular polarized light and detecting reflections thereof, or by requiring that all of the nodes in a free space laser communication network transmit their beacons and messages using circular polarized laser light. In the case of astronomical observations, the present disclosure is applicable to observation of light from a remote source that is naturally circular polarized, for example when studying strongly magnetic regions of the Sun's surface.

The disclosed optical beam splitter transforms the received laser light from circular polarization to linear polarization, where the direction of the linear polarization is well-defined and fixed. In embodiments, this conversion from circular polarization to linear polarization is performed by passing the received light through a quarter wave plate (QWP).

The linear polarized light is then directed to a variable retarder that is able to rotate the direction of linear polarization of the light through an arbitrary, adjustable rotation angle. Finally, the light impinges on a polarization beam splitter (PBS), which apportions the light between two channels according to a relative angle between the linear polarization direction of the light and the polarization direction of the PBS. If it is necessary to apportion the light among more than two channels, additional retarders and polarization beam splitters can be included.

In some embodiments the variable retarder is a half wave plate (HWP), and the angle of the linear polarization is adjusted by physically rotating the HWP. In other embodiments, the variable retarder is an electronically controlled device, such as a liquid crystal variable retarder (LCVR).

Also disclosed herein is a free space laser communication terminal similar to the laser communication terminal of co-pending U.S. patent application Ser. No. 16/720,362, in which the disclosed optical beam splitter is implemented as the receive beam splitter. According to this exemplary embodiment, rather than implementing a separate beacon laser, the communication signal wavelengths are used by the laser communication terminal to maintain optical alignment during the communication phase. During the alignment phase, the disclosed beam splitter diverts substantially all of the received light to the alignment channel. Once alignment with the remote node has been completed and there is a transition to the communication phase, the disclosed beam splitter is reconfigured to divert only a small percentage of the received light to the alignment channel, while a majority of the received light is directed to the communication channel. Implementation of the disclosed beam splitter thereby enables the disclosed laser communication terminal to adjust and optimize the apportioning of the received light between the two channels during each of the phases of operation.

In addition to receiving circular polarized laser light, embodiments of the disclosed laser communication terminal are also configured to transmit circular polarized light with the orthogonal characteristic. In some embodiments, the disclosed laser communication terminal receives right circular polarized laser light and transmits left circular polarized laser light, or vice versa, so that any transmitted laser light that inadvertently impinges upon the receiving input can be excluded from the receiver channel. Further details regarding these features are provided in U.S. patent application Ser. No. 16/694,082, now U.S. Pat. No. 10,637,572 and U.S. patent application Ser. No. 16/720,362, both of which are incorporated herein by reference in their entirety.

A first general aspect of the present invention is an optical beam splitter that is configured to receive light through free space from a remote light source, said light being circular polarized, and to apportion the received light between two outputs according to a continuously adjustable splitting ratio. The optical beam splitter includes a polarization converter configured to convert the received circular polarized light into liner polarized light having a defined initial light polarization direction, a retarder configured to rotate the light polarization direction from the initial light polarization direction to an adjusted polarization direction, and a polarization beam splitter having a splitter polarization direction, the polarization beam splitter being configured to apportion the received light among the first and second outputs according to a difference between the adjusted polarization direction and the splitter polarization direction.

In embodiments, the received light is circular polarized laser light.

In any of the above embodiments, the polarization converter can include a quarter wave plate.

In any of the above embodiments, the retarder can include a half wave plate, and the retarder can be configured to vary the adjusted polarization direction by mechanically rotating the half wave plate.

In any of the above embodiments, the retarder can include a liquid crystal variable retarder (LCVR) that is configured to electronically vary the adjusted polarization direction.

In any of the above embodiments, the remote light source can be an astronomical light source that emits light having naturally occurring circular polarization.

In any of the above embodiments, the optical beam splitter can be implemented in a LIDAR apparatus, and the remote light source can be a remote target that is reflecting circular polarized light transmitted by the LIDAR apparatus.

In any of the above embodiments, the remote light source can be a remote node in a free space laser communication network.

A second general aspect of the present invention is a free space laser communication terminal that is configured to establish optical alignment with a remote node during an alignment phase, and to receive laser communications transmitted by the remoted node during a communication phase. The free space laser communication terminal includes an alignment channel configured to establish and maintain optical alignment of the laser communication terminal with the remote node using received laser light received from the remote node, said received laser light being circular polarized, a communication channel configured to derive communication information from the received laser light during the communication phase, and a receive beam splitter according to claim 1, the receive beam splitter being configured to adjustably apportion the received laser light between the alignment channel and the communication channel.

In embodiments, the polarization converter of the receive beam splitter comprises a quarter wave plate.

In any of the above embodiments, the retarder of the receive beam splitter can include a half wave plate, and the retarder can be configured to adjust the adjusted polarization direction by mechanically rotating the half wave plate.

In any of the above embodiments, the retarder of the receive beam splitter can include a liquid crystal variable retarder (LCVR), and the LCVR can be configured to electronically vary the adjusted polarization direction.

Any of the above embodiments can further include a transmission channel configured to generate and transmit circular polarized laser light to the remote node.

A third general aspect of the present invention is a method of aligning a free space laser communication terminal with a remote node, and of maintaining said alignment while receiving laser transmitted messages from said remote node, without requiring receipt of a separate alignment beacon from the remote node, said laser communication terminal comprising an alignment channel and a communication channel. The method includes implementing the optical beam splitter of claim 1 as a receive beam splitter in the laser communication terminal, receiving laser light from the remote node, said received laser light being circular polarized, causing the receive beam splitter to divert substantially all of the received laser light to the alignment channel, aligning the laser communication terminal with the remote node according to the laser light received by the alignment channel, causing the receive beam splitter to re-apportion the received laser light between the alignment channel and the communication channel, such that at least 90% of the received laser light is apportioned to the communication channel, while no more than 10% of the received laser light is apportioned to the alignment channel, and while laser transmitted messages encoded in the received laser light are processed by the communication channel, simultaneously maintaining the alignment of the laser communication terminal with the remote node according to the no more than 10% of the received laser light that is apportioned to the alignment channel.

In embodiments, no more than 5% of the received laser light is apportioned to the alignment channel during the communication phase.

In any of the above embodiments, the retarder of the receive beam splitter can include a half wave plate, and causing the receive beam splitter to re-apportion the received laser light can include physically rotating the half wave plate.

And in any of the above embodiments, the retarder of the receive beam splitter can include a liquid crystal variable retarder (LCVR), and causing the receive beam splitter to re-apportion the received laser light can include electronically causing the LCVR to rotate a linear polarization direction of the received laser light.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

The present disclosure is an optical beam splitter and method of use thereof that enables light to be received over free space from a remote source and to be apportioned between two channels of an apparatus according to a continuously adjustable splitting ratio.

Figure 1A:
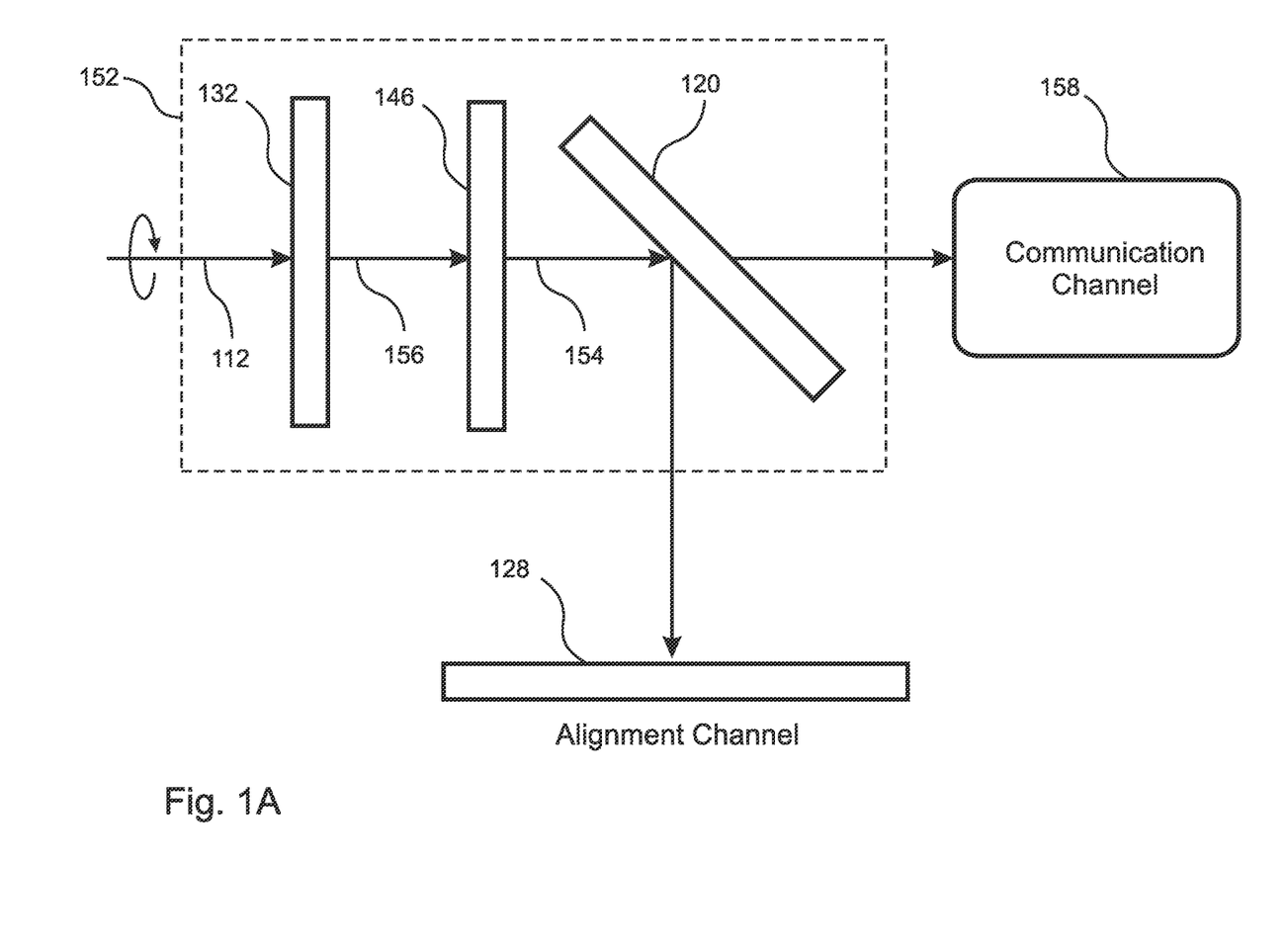
FIG. 1A is a block diagram of an optical beam splitter in an embodiment of the present disclosure.

With reference to FIG. 1A, circular polarized light 112 that is received over free space from a remote source passes through a polarization converter 132 that converts the received circular polarized light 112 into linear polarized light 156 having a well-defined polarization direction. In the embodiment of FIG. 1A, the polarization converter is a quarter wave plate (QWP).

The linear polarized light 156 then impinges upon a variable retarder 146 that is able to rotate the direction of linear polarization of the light 154 by an arbitrary, adjustable rotation angle. Subsequently, the light 154 impinges on a polarization beam splitter (PBS) 120, which apportions the light between two outputs 128, 158 according to a relative angle between the linear polarization direction of the impinging light 154 and the polarization direction of the PBS 120.

In some embodiments, the variable retarder 146 is a half wave plate (HWP), and the linear polarization angle of the laser light 154 is adjusted by physically rotating the HWP 146. In other embodiments, the variable retarder 146 is an electronically controlled device, such as a liquid crystal variable retarder (LCVR).

The two outputs 128, 158 of the laser beam splitter 152 in FIG. 1A have been labeled as the communication channel 158 and the alignment channel 128 in the figure. However, this labeling in FIG. 1A should not be considered to be limiting, and it should be understood that the scope of the present disclosure extends to all applications where an optical beam splitter receives circular polarized light 112 from a remote source, and apportions the received light 112 between two outputs 128, 158 according to an adjustable splitting ratio. It will be clear to one of skill in the art that the disclosure of FIG. 1A can be extended to implementations that require apportionment of the received light between more than two channels by directing at least one of the output channels 128, 158 to an additional retarder and PBS.

Figure 1B:
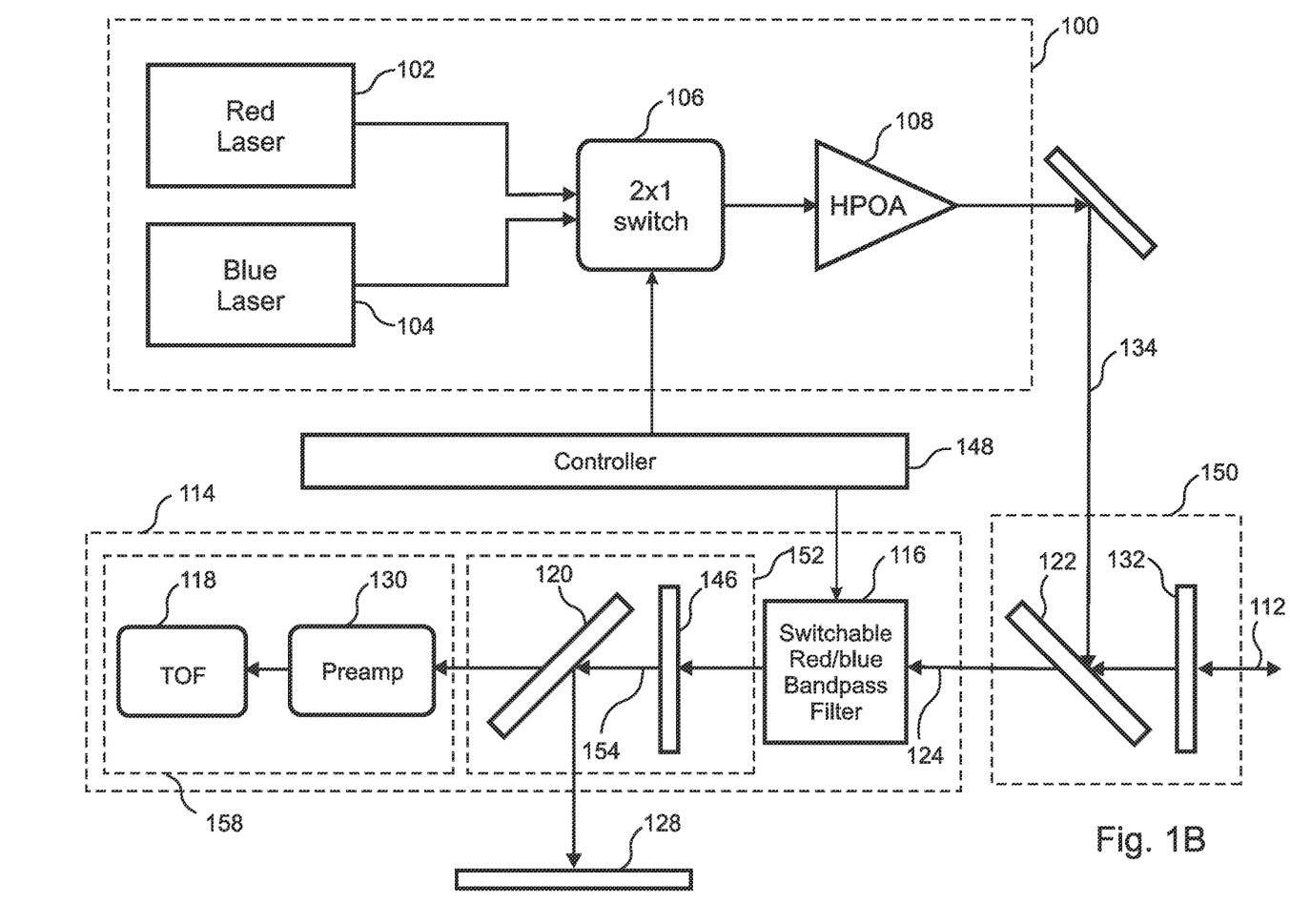
FIG. 1B is a block diagram of a very specific example of a free space laser communication terminal according to an embodiment of the present disclosure that implements the continuously variable, configurable beam splitter of FIG. 1A.

With reference to FIG. 1B, also disclosed herein is a free space laser communication terminal similar to the laser terminal of co-pending U.S. patent application Ser. No. 16/720,362 in which the disclosed optical beam splitter 152 is implemented as the receive beam splitter. The disclosed terminal is able to align itself with a remote node during an alignment phase, and then maintain alignment with the remote node during a communication phase, without implementing a separate beacon laser.

In these embodiments, once alignment with the remote node has been completed and the communication phase has begun, a portion of the communication laser signals themselves are used for spatial tracking to maintain optical alignment between the terminals. In particular, the disclosed optical beam splitter 152, implemented as the receive beam splitter 152 in the disclosed laser communication terminal, apportions the received laser light 112 between the communication channel 158 and the alignment channel 128, directing nearly all of the received laser light 112 to the alignment channel 128 during the acquisition and alignment phases, while directing only a small percentage of the received laser light 112 to the alignment channel 128 during the communication phase.

The disclosed functionality of the laser communication terminal of FIG. 1B requires that the received laser light must be circular polarized. Typically, this requirement is met by requiring that all of the notes in a free space laser communication network or subnet be configured to transmit and received circular polarized laser light. Accordingly, the laser communication terminal of FIG. 1B is also configured to transmit circular polarized laser light 112. The laser communication terminal of FIG. 1B is further configured to receive right circular polarized laser light and transmit left circular polarized laser light, or vice versa, so that any transmitted laser light that inadvertently impinges upon the receiver input can be excluded from the receiver channel. More information regarding these features can be found in U.S. patent application Ser. No. 16/694,082, now U.S. Pat. No. 10,637,572, and U.S. patent application Ser. No. 16/720, 362, both of which are incorporated herein by reference in their entireties.

In the embodiment of FIG. 1B, the transmit and receive wavelengths are configurable on command, and the laser communication terminal receive module 114 comprises filter assemblies 116 which can be transitioned according to instructions from a controller 148 between directing "red" laser light to the communication channel 158 and "blue" laser light to the communication channel 158, while excluding other extraneous light. In embodiments that include only one transmit laser and are limited to receiving communication laser beams at only one wavelength, the filter assembly 116 is fixed at the receive wavelength.

The variable receive beam splitter 152 in the embodiment of FIG. 1B apportions the laser light 124 that is received from the remote laser communication node between the preamplifier 130 of the communication channel 158 and an "acquisition and tracking sensor" (ATS) of the alignment channel 128 that is used to establish and maintain optical alignment with the remote node. The light that emerges from the communication channel preamplifier 130 is directed to a tunable optical filter (TOF) 118, and ultimately to a detector (not shown).

In the embodiment of FIG. 1B, the receive beam splitter 152 in the receive module 114 includes a variable retarder 146 that is a half-waveplate 146, and the percentage of the received light 124 that is directed to the alignment channel 128 is adjusted by mechanically rotating the half-waveplate 146, for example using a stepper motor (not shown). In other embodiments, the variable retarder 146 is an electronically controlled device, such as a liquid crystal variable retarder (LCVR), that is able to adjust the percentages of the received laser light that are apportioned to the alignment channel 128 and to the communication channel 158 without mechanical manipulation.

In the specific embodiment of FIG. 1B, the disclosed laser communication terminal comprises a transmit laser module 100 that includes two transmit lasers 102, 104, i.e. a "first" transmit laser 102 and a "second" transmit laser 104, which are referred to herein as the "red" laser 102 and the "blue" laser 104. Similar embodiments include only one transmit laser.

During the alignment phase, one or both of the two transmit lasers 102, 104 of FIG. 1B are used to generate a beacon laser output. Either of the transmit lasers 102, 104 can be selected to generate the beacon by a 2×1 switch 106, or the switch 106 can toggle between the two transmit lasers 102, 104 to create a "ping-pong" modulated output beacon. The light from the 2×1 switch 106 is then amplified by a high-power optical amplifier (HPOA) 108.

The laser communication terminal of FIG. 1B is configured to transmit circular polarized laser beams into the free-space path to the remote node, and to direct and differentiate received laser light from the remote node according to its polarization state. The embodiment of FIG. 1B includes an input/output diplexer 150 that imposes circular polarization onto all of the laser light 112 that is transmitted by the laser communication terminal, including both the beacon that is transmitted during the acquisition phase and the communication beams that are transmitted during the communication phase. In the illustrated embodiment, the transmit laser module 100 is configured to emit a linearly polarized beam. The input/output diplexer 150 includes an input/output polarization beam splitter 122 followed by an input/output polarization converter (i.e. quarter-wave plate) 132 that converts the linear polarized light from the beam splitter 122 into a circular polarized output beam 112. In embodiments, quarter wave plate 132 can be mechanically or electronically transitioned between imposing right and left circular polarization onto the output beam 112. The input/output quarter wave plate 132 also converts received circular polarized light into linear polarized light 124 that is directed by the input/output polarization beam splitter 122 to the receive module 114.

Figure 1C:
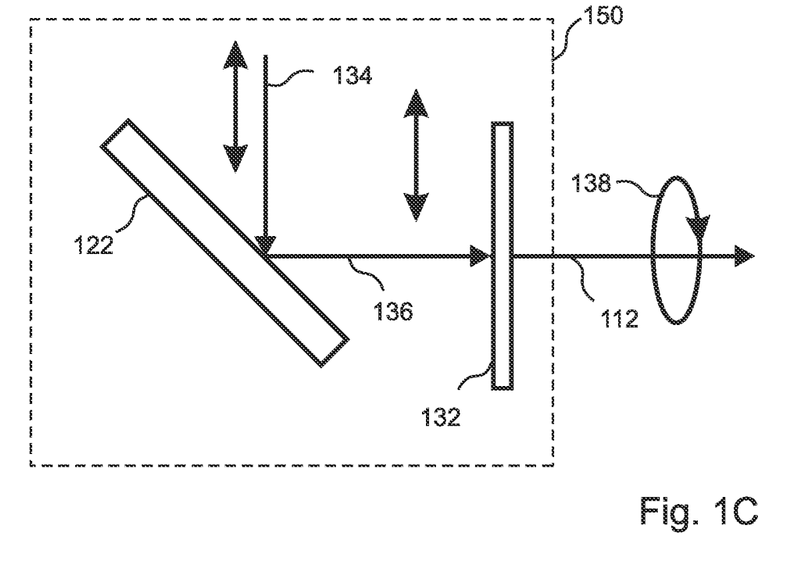
FIG. 1C is a block diagram that illustrates the interaction between transmitted laser light and the input/output polarization beam splitter and waveplate in an embodiment of the present disclosure.

For example, with reference to FIG. 1C, if the transmit laser module 100 is configured to emit vertically polarized "red" light 134, then the input/output polarization beam splitter 122 will be horizontally polarized, and the vertically polarized red light 134 from the transmit laser module 100 will be reflected 136 by the input/output polarization beam splitter 122 to the input/output quarter wave plate 132, and converted thereby into an output beam 112 that is right circular polarized 138 (according to the illustrated example).

Figure 1D:
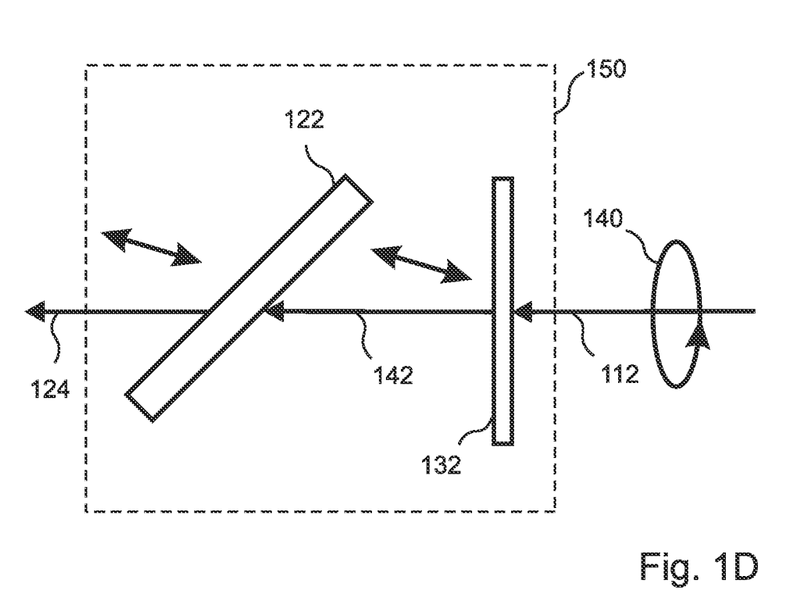
FIG. 1D is a block diagram that illustrates the interaction between received laser light and the input/output polarization beam splitter and waveplate in an embodiment of the present disclosure.

With reference to FIG. 1D, communications 112 will be received according to this example as left circular polarized 140 light 112, which will be converted into horizontally polarized blue light 142 by the quarter-wave plate 132, and then transmitted through the polarization beam splitter 122 as received light 124 into the receive module 114.

Figure 2:
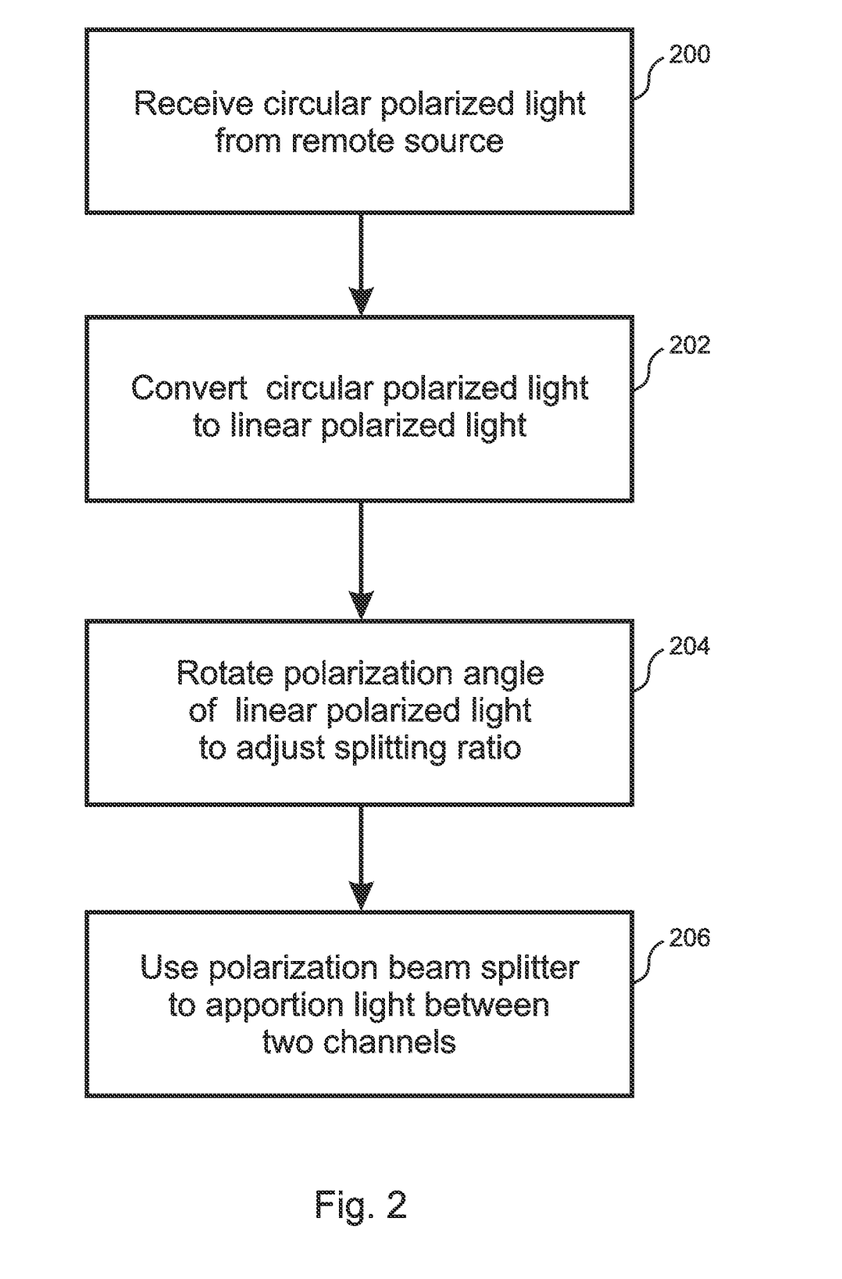
FIG. 2 is a flow diagram illustrating a method of causing the beam splitter of FIG. 1A to apportion light between two outputs in an embodiment of the present disclosure.

With reference to FIG. 2, method embodiments of the present disclosure that are applicable to the optical beam splitter of FIG. 1A include receiving circular polarized light via free space from a remote source 200, converting the circular polarized light into linear polarized light 202 having a well-characterized polarization direction, using a retarder to rotate the polarization direction 204 of the liner polarized light, thereby determining the splitting ratio, and then using a polarization beam splitter to apportion the laser light between two channels 206 of the apparatus.

Figure 3:
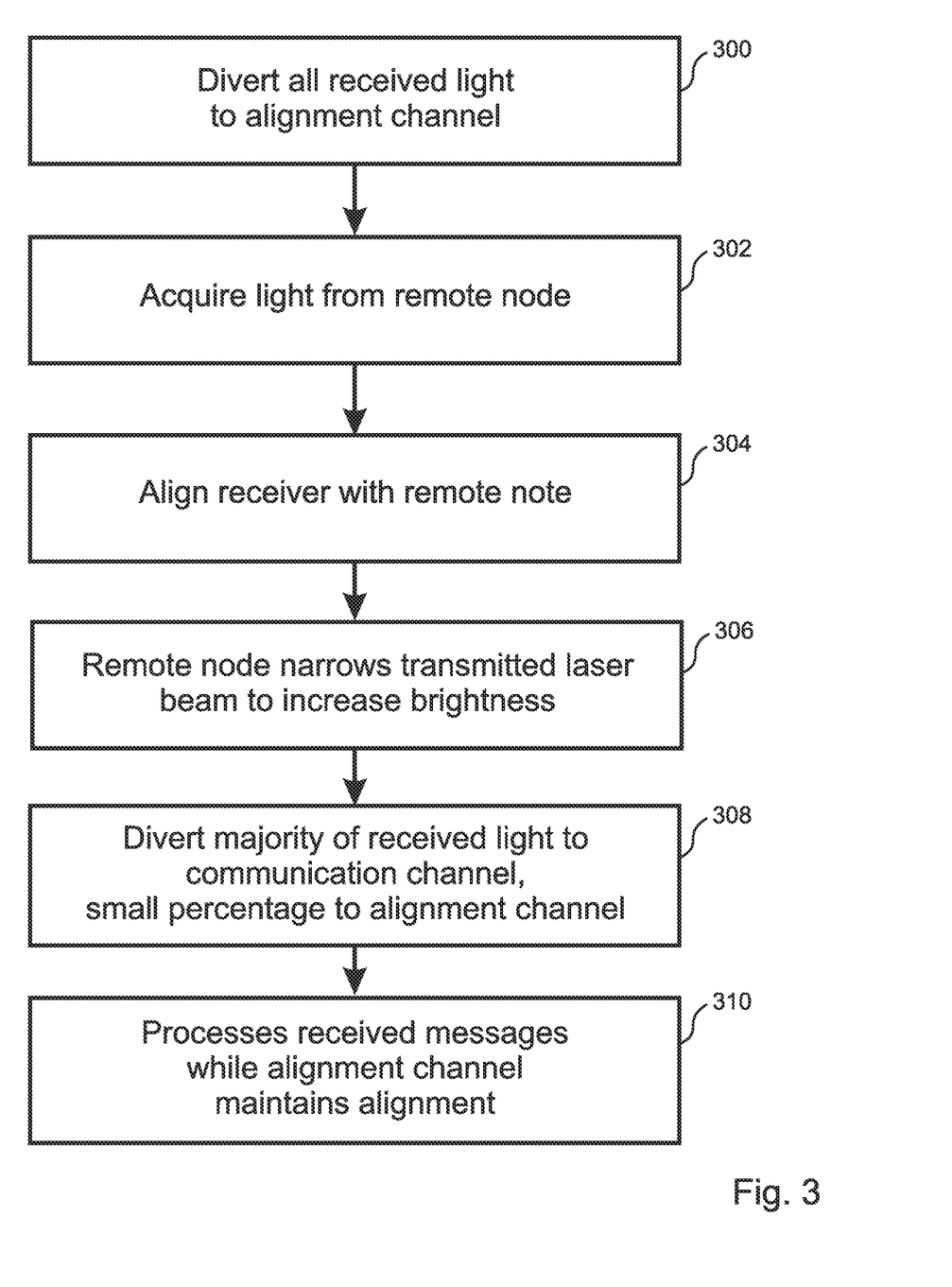
FIG. 3 is a flow diagram illustrating a method of causing the free space laser communication terminal of FIG. 1B to divert substantially all received light to an alignment channel during an alignment phase, and then to re-apportion the received light between the alignment channel and a communication channel during a communication phase.

With reference to FIG. 3, method embodiments that are applicable to the free space laser communication terminal of FIG. 1B include adjusting the receive beam splitter 152 to divert 300 all of the received light to the alignment channel 128 during the alignment phase, acquiring circular polarized light via free space from the remote node 302, aligning the optics of the terminal with the received light from the remote node 304, and then, upon transitioning to the communication phase, and after the remote node has narrowed its transmitted laser beam to increase its brightness 306, reconfiguring the receive beam splitter 152 so as to direct a majority of the light received from the remote node to the communication channel 158, while continuing to direct a small percentage of the received light to the alignment channel 308, and processing the received messages while the alignment channel continues to maintain alignment of the terminal with the remote node 310.

Accordingly, once the acquisition and alignment phase has been completed, and the communication phase has begun, the communication signals themselves are used to maintain optical alignment between the terminals. In embodiments, substantially all of the received laser light, e.g. 98%, is directed to the alignment channel 128 by the laser beam splitter 152 during the alignment phase 300, while only a small percentage, for example 5-20%, of the received laser light 124, is directed to the alignment channel 128 during the communication phase 306, with the remainder being directed to the communication channel 158.

The disclosed approach of requiring that laser communication beams in a free space laser communication network must be circular polarized, converting circular polarized light received from a remote node to linear polarized light having a well-characterized polarization direction, and using a retarder 146 in combination with a polarization beam splitter 120 to continuously vary the amount of light that is diverted to the ATS 128, provides a significant performance enhancement to embodiments of the disclosed laser communication terminal in comparison to traditional approaches. For example, the disclosed apparatus and method can direct five times as much light to the alignment channel during the alignment phase, in comparison with traditional approaches that use a fixed ratio beam splitter to divert 20% of the received light to the alignment channel during all phases of operation.

The foregoing description of the embodiments of the disclosure has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the disclosure to the precise form disclosed. Many modifications and variations are possible in light of this disclosure.

Although the present application is shown in a limited number of forms, the scope of the disclosure is not limited to just these forms, but is amenable to various changes and modifications without departing from the spirit thereof. The disclosure presented herein does not explicitly disclose all possible combinations of features that fall within the scope of the disclosure. The features disclosed herein for the various embodiments can generally be interchanged and combined into any combinations that are not self-contradictory without departing from the scope of the disclosure. In particular, the limitations presented in dependent claims below can be combined with their corresponding independent claims in any number and in any order without departing from the scope of this disclosure, unless the dependent claims are logically incompatible with each other.

I claim:

1. An optical beam splitter that is configured to receive light through free space from a remote light source, said light being circular polarized, and to apportion the received light between an alignment channel and a communication channel according to an adjustable splitting ratio, the optical beam splitter comprising:
   a polarization converter configured to convert the received circular polarized light into linear polarized light having a defined initial light polarization direction;
   a retarder configured to rotate the light polarization direction from the initial light polarization direction to an adjusted polarization direction and establish the adjustable splitting ratio; and
   a polarization beam splitter having a splitter polarization direction, the polarization beam splitter being configured to apportion the received light among the the alignment channel and the communication channel according to the adjustable splitting ratio, wherein the adjustable splitting ratio directs substantially all of the received light to the alignment channel during an acquisition phase and substantially all of the received light to the communication channel during a communication phase.

2. The optical beam splitter of claim 1, wherein the received light is circular polarized laser light.

3. The optical beam splitter of claim 1, wherein the polarization converter comprises a quarter wave plate.

4. The optical beam splitter of claim 1, wherein the retarder comprises a half wave plate, and wherein the retarder is configured to vary the adjusted polarization direction by mechanically rotating the half wave plate.

5. The optical beam splitter of claim 1, wherein the retarder comprises a liquid crystal variable retarder (LCVR), and wherein the retarder is configured to electronically vary the adjusted polarization direction.

6. The optical beam splitter of claim 1, wherein the remote light source is an astronomical light source that emits light having naturally occurring circular polarization.

7. The optical beam splitter of claim 1, wherein the optical beam splitter is implemented in a LIDAR apparatus, and wherein the remote light source is a remote target that is reflecting circular polarized light transmitted by the LIDAR apparatus.

8. The optical beam splitter of claim 1, wherein the remote light source is a remote node in a free space laser communication network.

9. A free space laser communication terminal that is configured to establish optical alignment with a remote node during an alignment phase, and to receive laser communications transmitted by the remote node during a communication phase, the free space laser communication terminal comprising:
   an alignment channel configured to establish and maintain optical alignment of the laser communication terminal with the remote node using received laser light received from the remote node, the received laser light being circular polarized;
   a communication channel configured to derive communication information from the received laser light during the communication phase; and
   a receive beam splitter the receive beam splitter being configured to adjustably apportion the received laser light between the alignment channel and the communication channel, wherein the receive beam splitter is an optical beam splitter comprising a polarization converter, a retarder, and a polarization beam splitter;
   and wherein the receive beam splitter adjustably apportions the received laser light between the alignment channel and the communication channel according to an adjustable splitting ratio that directs substantially all of the received laser light to the alignment channel during the acquisition phase and substantially all of the received light to the communication channel during the communication phase.

10. The laser communication terminal of claim 9, wherein the polarization converter of the receive beam splitter comprises a quarter wave plate.

11. The laser communication terminal of claim 9, wherein the retarder of the receive beam splitter comprises a half wave plate, and wherein the retarder is configured to adjust the adjusted polarization direction by mechanically rotating the half wave plate.

12. The laser communication terminal of claim 9, wherein the retarder of the receive beam splitter comprises a liquid crystal variable retarder (LCVR), and wherein the LCVR is configured to electronically vary the adjusted polarization direction.

13. The laser communications terminal of claim 9, further comprising a transmission channel configured to generate and transmit circular polarized laser light to the remote node.

14. A method of aligning a free space laser communication terminal with a remote node, and of maintaining the alignment while receiving laser transmitted messages from the remote node, without requiring receipt of a separate alignment beacon from the remote node, the laser communication terminal comprising an alignment channel and a communication channel, the method comprising:
    implementing an optical beam splitter as a receive beam splitter in the laser communication terminal, wherein the optical beam splitter comprises a polarization converter; a retarder; and a polarization beam splitter;
    receiving laser light from the remote node, the received laser light being circular polarized;
    causing the receive beam splitter to divert substantially all of the received laser light to the alignment channel;
    aligning the laser communication terminal with the remote node according to the laser light received by the alignment channel;
    causing the receive beam splitter to re-apportion the received laser light between the alignment channel and the communication channel, such that at least 90% of the received laser light is apportioned to the communication channel, while no more than 10% of the received laser light is apportioned to the alignment channel; and
    while laser transmitted messages encoded in the received laser light are processed by the communication channel, simultaneously maintaining the alignment of the laser communication terminal with the remote node according to the no more than 10% of the received laser light that is apportioned to the alignment channel.

15. The method of claim 14, wherein no more than 5% of the received laser light is apportioned to the alignment channel during the communication phase.

16. The method of claim 14, wherein the retarder of the receive beam splitter comprises a half wave plate, and wherein causing the receive beam splitter to re-apportion the received laser light includes physically rotating the half wave plate.

17. The method of claim 14, wherein the retarder of the receive beam splitter comprises a liquid crystal variable retarder (LCVR), and wherein causing the receive beam splitter to re-apportion the received laser light includes electronically causing the LCVR to rotate a linear polarization direction of the received laser light.

* * * * *